May 27, 1930.  J. W. DENTON  1,759,977
CAMP COT FOR AUTOMOBILES
Filed July 26, 1928  3 Sheets-Sheet 1
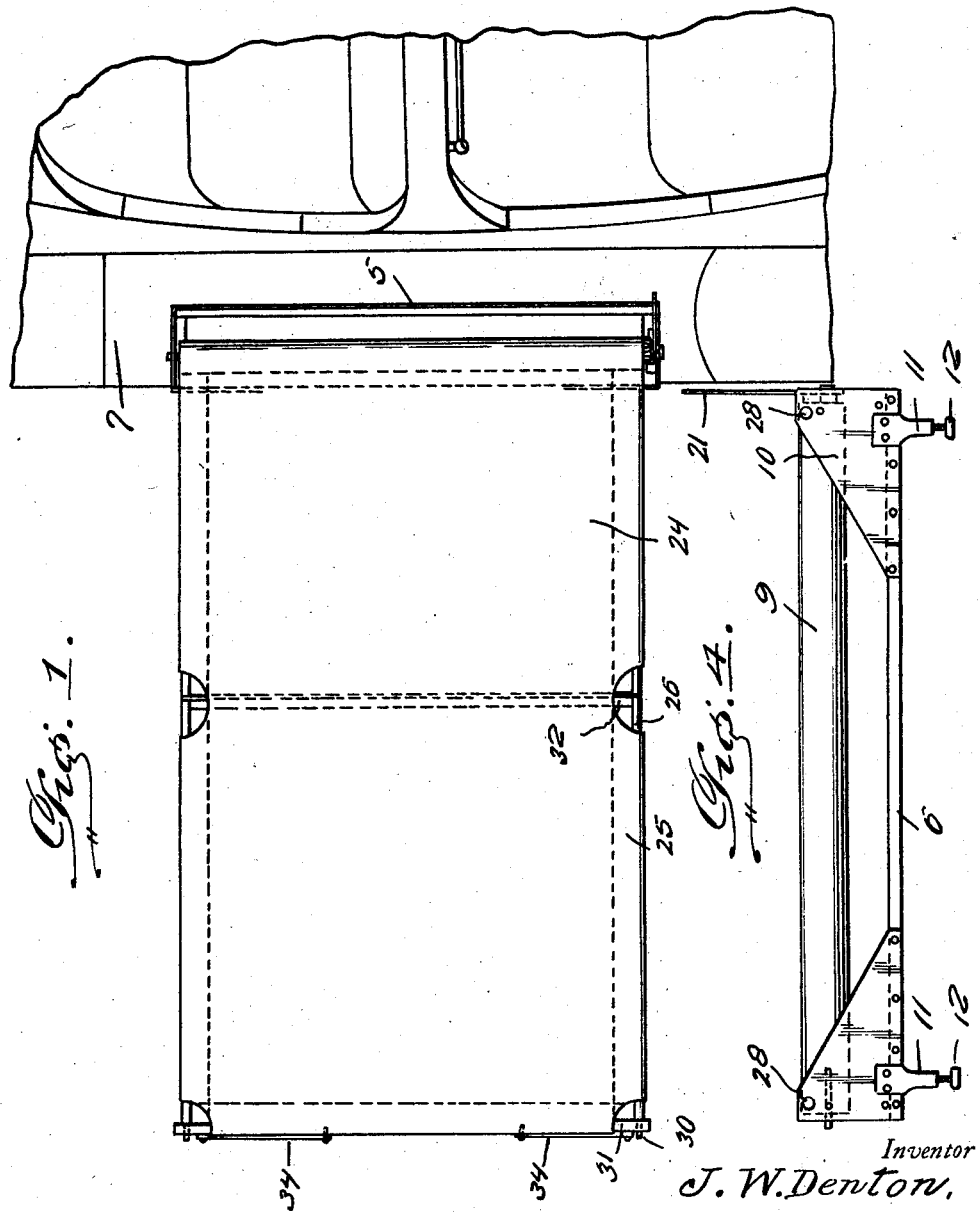
Inventor
J. W. Denton,
By Clarence A. O'Brien
Attorney May 27, 1930.   J. W. DENTON   1,759,977
CAMP COT FOR AUTOMOBILES
Filed July 26, 1928   3 Sheets-Sheet 2
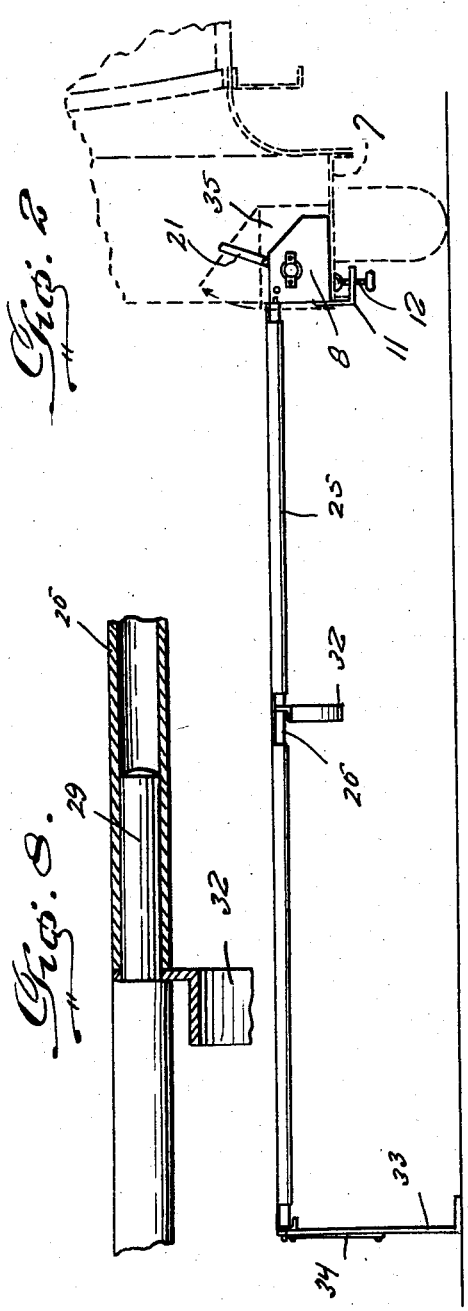
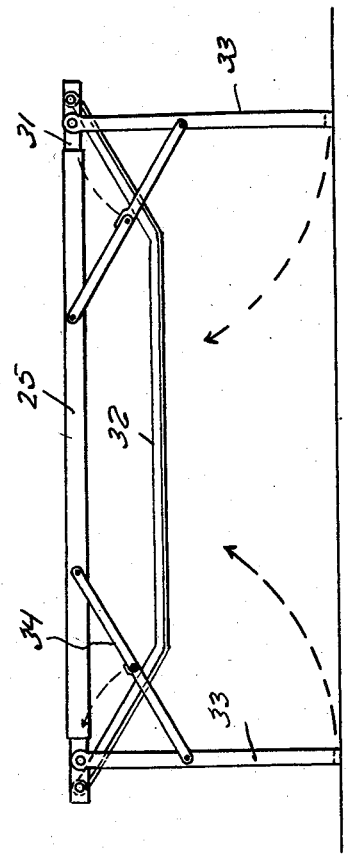
Inventor
J. W. Denton,
By *Clarence A. O'Brien*
Attorney

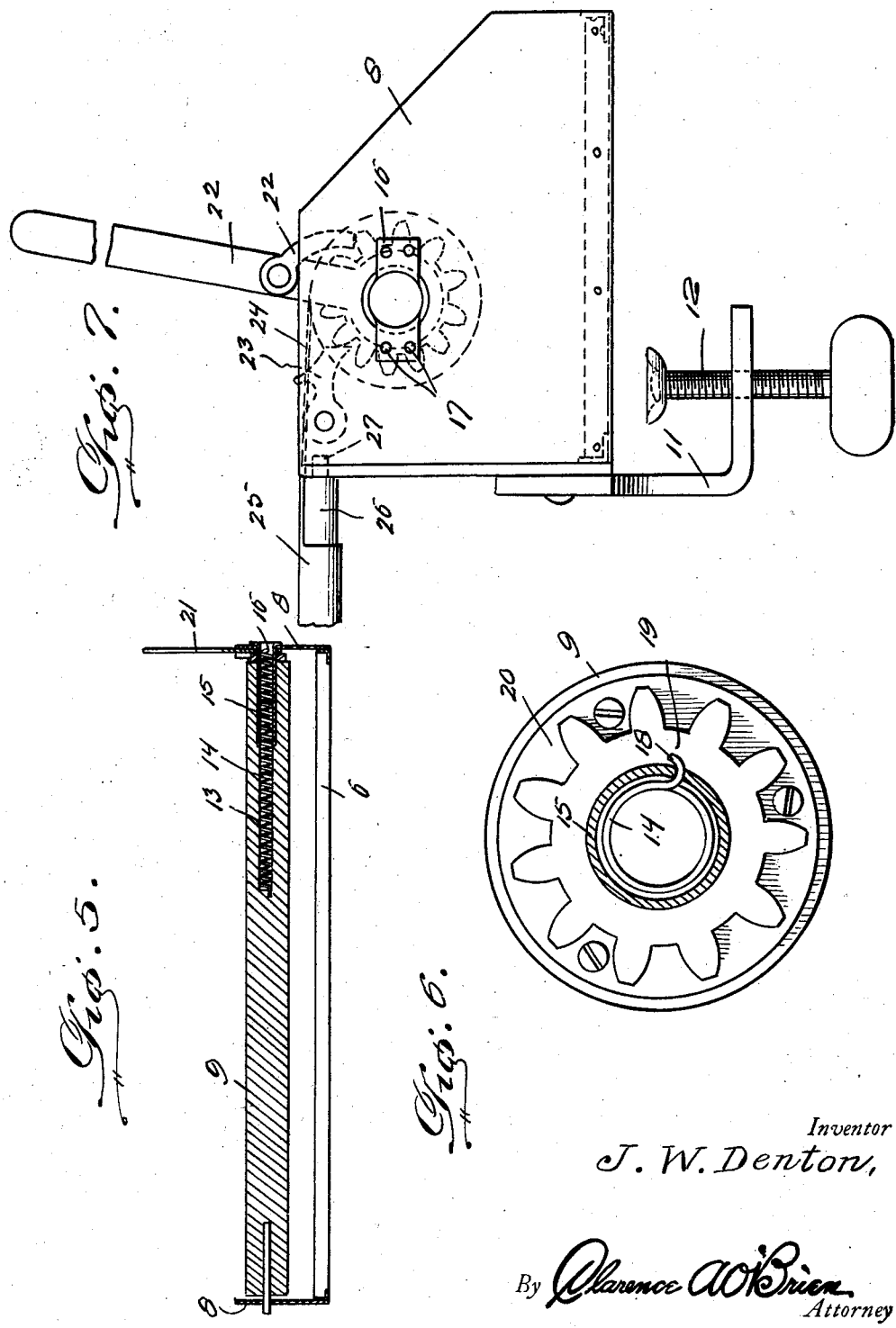

Patented May 27, 1930

1,759,977

UNITED STATES PATENT OFFICE

JOHN W. DENTON, OF PONCA CITY, OKLAHOMA

CAMP COT FOR AUTOMOBILES

Application filed July 26, 1928. Serial No. 295,366.

The present invention relates to camp cots for automobile tourists and has for its principal object to provide a foldable cot frame adapted for folding within a relatively small space upon the running board of the vehicle and provided with foldable detachable legs for supporting the frame upon the ground when in use and which may be stored in a convenient position and stored in an out of the way position in a convenient part of the vehicle when not in use.

A further object of the invention is to provide a bed of flexible material for the cot adapted to be stretched upon the frame thereof and attaching one end of the bed material to a spring roller for rolling said material thereabout when not in use.

An additional object is to provide ratchet teeth for the roller adapted to stretch the bed material upon the frame of the cot in order to comfortably support the body of a person.

A still further object is to provide an apparatus of this character of a simple and practical construction, which is strong and durable, neat and attractive in appearance, relatively inexpensive to manufacture and install in position for use or upon the running board of a vehicle and otherwise well adapted for the purpose for which the same is intended.

Other objects and advantages reside in the special construction, combination, and arrangement of the various elements forming the invention as more fully hereinafter described and claimed, reference being had to the accompanying drawings forming part hereof, wherein like numerals refer to like parts throughout, and in which:

In the drawings

Figure 1 is a top plan view of the cot shown in position ready for use,

Figure 2 is a side elevational view thereof on a slightly large scale,

Figure 3 is an end elevational view further enlarged,

Figure 4 is a front elevational view of the mounting for the spring roller adapted for clamping to the running board of the vehicle, Figure 5 is a longitudinal sectional view through the spring roller and mounted thereon, Figure 6 is an enlarged transverse sectional view of one end of the spring roller showing the manner in which the end of the spring is attached to the ratchet wheel carriage thereon, Figure 7 is an enlarged end elevational view of the roller mounting with the clamp for attaching the same to the running board of the vehicle and Figure 8 is an enlarged fragmentary longitudinal sectional view illustrating the manner of connecting the sections of the frame intermediate the ends thereof and providing an attachment for the end of a transverse brace.

Referring now to the drawing in detail, for the purpose of illustration, I have disclosed a preferred embodiment of my invention, and which comprises a spring roller mounting indicated generally at 5 and composed of a substantially rectangular shaped frame 6 constructed of sections of angle iron having their ends secured to each other in a suitable manner well known in the art and adapted to rest upon the upper surface of an automobile running board 7.

A pair of plates 8 are attached at the ends of the springs extending upwardly therefrom in spaced parallel relation and provided with openings within which the ends of the spring roller 9 are journaled.

Segmental plates 10 are also secured at each of the front corners of the frame and to which are attached clamping brackets 11 extending beneath the running board and provided with threaded clamping bolts 12 for engaging the under sides of the running board and clamping the frame in position thereon.

One end of the spring roller 9 is provided with a bore 13 within which a coil spring 14 is inserted having its inner end fixedly secured to the body of the roller. A sleeve 15 is also inserted within the bore of the roller within which the outer end of the spring is disposed, the outer end of the sleeve being inserted through the opening in the end plate 8 of the frame and formed with a pair of oppositely extending lugs 16 fixedly secured to the outer side of the end plates by bolts or rivets 17.

The sleeve is thus secured against rotation and forms a rotatable mounting for one end of the roller. The outer end of the spring 14 is inserted through an opening formed in the sleeve so that the rotation of the roller will operate to create a tension on the spring.

To the end of the roller provided with the spring is secured a ratchet wheel 19 by means of a plate 20, the ratchet wheel having a central opening through which the sleeve 15 is extended so as to permit the positioning of the ratchet wheel between the end of the roller and the end plates.

An operating handle 21 is pivotally mounted at one end upon the sleeve 15, between the ratchet wheel and the end plate 8 and carries a dog 22 engageable with the teeth of the ratchet whereby to provide for the operation of the roller in one direction.

A second dog 23 is pivoted to the inner side of the end plate and has its free end also, engageable with the teeth of the ratchet to prevent the movement of the same in a direction opposite to that in which the ratchet is operated by the handle 21. A sheet of canvas or similar fabric is attached at one end to the roller for rolling thereabout and arranged when unrolled, to extend outwardly from the edge of the running board and is provided at its outer edge and at each side edge with a hem indicated at 25.

In the hems at the side of the cot is inserted a sectional rod 26, the inner and outer ends of said rods being reduced as shown at 27, the inner ends of the rod being inserted in openings 28 formed adjacent the top edge of the segmental plates 10 and substantially on a horizontal plane with the upper edge of the roller.

The sections of the rod 26 are preferably of a tubular formation and the ends of the outer sections are formed wth reduced extremities 29, one of which is adapted for insertion in the outer end of the inner section as clearly illustrated in Figure 8 of the drawing.

The reduced extremities indicated at 30 on the outer ends of the outermost section are inserted in openings at the end of an end frame member 31 for the cot, which is preferably constructed of angle iron as illustrated in Figure 2 of the drawings and is extended through the hem at the outer end of the cot.

A transverse brace 32 is disposed intermediate the ends of the cot, said brace being likewise constructed of angle iron and provided with openings at each end through which the reduced extremity 29 of the outermost section of the side rods may extend.

The intermediate section of the brace 32 is disposed in offset relation from the horizontal plane of the cot so as not to come in contact with the body of the person lying on the cot. The end frame member 31 and brace 32 thus secure the side rods in uniform spaced relation. To the outer transverse frame member 31 is attached a pair of folding legs 33 pivotally mounted at one end to the member and adapted to swing upwardly and inwardly in longitudinal alinement with said member when disposed in folded position.

Folding braces 34 connect the legs with the frame member whereby to prevent the legs from collapsing when supporting the cot. After the canvas or other fabric forming the bed for the cot has been mounted on the frame, the same may be set taut through the operation of the ratchet wheel through the handle 21.

The dog 23 engaging the teeth of the ratchet wheel will retain the material in its stretched position for suitably holding the weight of a person without sagging. When it is desired to disassemble the cot the ratchet wheel is released from the dog 23 and after removing the frame members of the cot, the roller may then be rotated through the action of the spring for rolling the material upon said roller.

The roller and mounting for the same may be enclosed within a suitable box indicated by the dotted line at 35 in Figure 2 of the drawing whereby to form a suitable protection for the device.

If desired the cot may be used independent of the automobile by providing an additional pair of folding legs for the end of the cot attached to the roller. When using the cot independent of the automobile it is understood that the material is detached from the roller and an additional transverse end frame member is substituted in lieu thereof similar to the frame member 31.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

A folding cot comprising in combination a pair of spaced apart upstanding plates, a roller journaled at one end in one of said plates and having a bore formed in its opposite ends, a tubular member fixedly secured to the other of said plates and freely inserted in the bore for rotatably supporting the roller, spring means disposed in the bore with its opposite ends attached respectively to the roller and the tubular member, a bed frame extending outwardly from the plates and comprising a pair of sectional side rails having their ends reduced, a transverse end rail disposed outwardly from the plates, said plates and said end rail having openings therein for receiving the respective reduced ends of the side rails, said side rails operating to maintain the plates and end rail in spaced relation, a fabric covering for the frame having its end attached respectively to said roller and said transverse rail and having hems along its side edges through which to freely insert the side rails and a pawl and ratchet mechanism for the roller adapted to tighten the fabric thereabout for stretching the fabric longitudinally on the frame.

In testimony whereof I affix my signature.

JOHN W. DENTON.